United States Patent [19]

Yamaguchi et al.

[11] Patent Number: 4,843,046

[45] Date of Patent: Jun. 27, 1989

[54] CERAMIC COMPOSITION OF HIGH DIELECTRIC CONSTANT COMPRISING $PBO_3$, $LA_2O_3$, MO, $ZRO_2$ AND $TIO_2$

[75] Inventors: Takashi Yamaguchi, Saitama; Takeshi Inoue, Sakura; Masashi Saito, Saitama, all of Japan

[73] Assignee: Mitsubishi Mining and Cement Co., Ltd., Tokyo, Japan

[21] Appl. No.: 82,007

[22] Filed: Aug. 4, 1987

[30] Foreign Application Priority Data

Oct. 15, 1986 [JP] Japan .................. 61-244360

[51] Int. Cl.$^4$ .................. C04B 35/49; C04B 35/46
[52] U.S. Cl. .................. 501/136; 501/138; 501/139
[58] Field of Search .................. 501/136, 138, 139

[56] References Cited

U.S. PATENT DOCUMENTS

| | | | |
|---|---|---|---|
| 2,960,411 | 11/1960 | Brajer et al. | 501/136 |
| 3,660,124 | 5/1972 | Yoshioka et al. | 501/136 |
| 3,684,714 | 8/1972 | Carl et al. | 501/152 |
| 3,994,823 | 11/1976 | Ainger et al. | 501/134 |
| 4,027,209 | 5/1977 | Maher | 501/134 |
| 4,135,224 | 1/1979 | Maher | 501/134 |
| 4,152,280 | 5/1979 | Arendt et al. | 501/136 |
| 4,219,866 | 8/1980 | Maher | 501/134 |
| 4,228,482 | 10/1980 | Bouchard et al. | 501/136 |
| 4,706,163 | 11/1987 | Maher | 264/61 |

FOREIGN PATENT DOCUMENTS 59-202619 11/1984 Japan 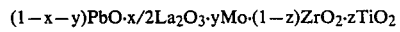 501/136

*Primary Examiner*—William R. Dixon, Jr.
*Assistant Examiner*—David M. Brunsman
*Attorney, Agent, or Firm*—Frank J. Jordan; C. Bruce Hamburg; Manabu Kanesaka

[57] ABSTRACT

Disclosed herein is a ceramic composition of high dielectric constant which comprises the major constituents of PbO, $La_2O_3$, MO, $ZrO_2$, and $TiO_2$ in the ratio defined by the formula below.

$$(1-x-y)PbO \cdot x/2La_2O_3 \cdot yMo \cdot (1-z)ZrO_2 \cdot zTiO_2$$

where,
M represents Ba and/or Sr;
$0.06 \leq x \leq 0.30$
$0.03 \leq y \leq 0.48$
$0.20 \leq z \leq 0.50$ and an additive represented by $PbWo_4$ and/or $Pb(Mg_{1/2}W_{1/2})O_3$ in an amount of 1-40 wt % (in total) based on the above-mentioned major constituents (provided that the amount of $PbWO_4$ is less than 15 wt % of the amount of the major constituents and the amount of $Pb(Mg_{1/2}W_{1/2})O_3$ is less than 40 wt % of the amount of the major constituents). Less than 5 mol % of all Pb in the composition may be replaced by Ag and/or less than 6 mol % of all Pb in the composition may be replaced by Bi.

12 Claims, No Drawings

CERAMIC COMPOSITION OF HIGH DIELECTRIC CONSTANT COMPRISING PBO₃, LA₂O₃, MO, ZRO₂ AND TIO₂

FIELD OF THE INVENTION AND RELATED ART STATEMENT

The present invention relates to a dielectric ceramic composition, and more particularly it is concerned with a ceramic composition of high dielectric constant which is superior in the temperature characteristics of dielectric constant and is capable of sintering at a low temperature (say, lower than 1100° C.).

Heretofore, the ceramic composition of high dielectric constant has been dominated by the one composed mainly of barium titanate. The barium titanate-based composition has a disadvantage that the sintering temperature is as high as 1300°–1400° C. and hence the sintering cost is high. Where it is used for multilayer ceramic capacitors, the high sintering temperature makes it necessary to make the internal electrode from an expensive high-melting noble metal such as Pd and Pt. This is an obstacle to the cost reduction of multilayer ceramic capacitors.

For this reason, there has been a demand for a dielectric material for monolithic ceramic capacitors capable of sintering at a low temperature which will permit the internal electrodes to be made of an inexpensive silver-based material. It will help reduce the production cost of multilayer ceramic capacitors.

OBJECT AND SUMMARY OF THE INVENTION

It is an object of the present invention to provide a ceramic composition of high dielectric constant which is capable of sintering at a low temperature and has good temperature characteristics of dielectric constant.

It is another object of the invention to provide a ceramic composition which can be made into small-sized large-capacity capacitors of high reliability at a low cost.

The object is achieved by a ceramic composition of high dielectric constant which comprises the major constituents of PbO, La$_2$O$_3$, MO, ZrO$_2$, and TiO$_2$ in the ratio defined by the formula below.

$$(1-x-y)\text{PbO}\cdot(x/2)\text{La}_2\text{O}_3\cdot y\text{MO}\cdot(1-z)\text{ZrO}_2\cdot z\text{TiO}_2$$

where,
M represents Ba and/or Sr;
$0.06 \leq x \leq 0.30$
$0.03 \leq y \leq 0.48$
$0.20 \leq z \leq 0.50$
and an additive represented by PbWO$_4$ and/or Pb(Mg$_{\frac{1}{2}}$W$_{\frac{1}{2}}$)O$_3$ in an amount of 1–40 wt% (in total) based on the above-mentioned major constituents (provided that the amount of PbWO$_4$ is less than 15 wt% of the amount of the major constituents and the amount of Pb(Mg$_{\frac{1}{2}}$W$_{\frac{1}{2}}$)O$_3$ is less than 40 wt% of the amount of the major constituents). The ceramic composition also includes one in which less than 5 mol% of Pb is replaced by Ag, one in which less than 6 mol% is replaced by Bi, and one in which less than 5 mol% of Pb is replaced by Ag and less than 6 mol% of Pb is replaced by Bi.

DETAILED DESCRIPTION OF PREFERRED EMBODIMENTS

The perovskite-type compound composed of PbO, La$_2$O$_3$, ZrO$_2$, and TiO$_2$ takes on various phases depending on its composition. Among the various phases, the anti-ferroelectric phase is superior in the temperature characteristics and bias characteristics of dielectric constant in spite of its high dielectric constant. The perovskite-type ceramic composition, however, has a disadvantage that its sintering temperature is higher than 1200° C. and the sintering at a high temperature causes a significant amount of Pb vaporization. Moreover, the high sintering temperature makes the composition impractical for the production of multilayer ceramic capacitors having internal electrodes of Pd or Pd-Ag alloy, because the dielectric substance vigorously reacts with the internal electrodes during sintering at a high temperature.

The present invention provides a ceramic composition of high dielectric constant which comprises a perovskite-type composition (ABO$_3$) of PbO, La$_2$O$_3$, ZrO$_2$, and TiO$_2$, with site A replaced by Ba and Sr, and an additive of composition represented by PbWO$_4$ and/or Pb(Mg$_{\frac{1}{2}}$W$_{\frac{1}{2}}$)O$_3$. The ceramic composition is capable of sintering at a low temperature below 1100° C. and has superior temperature characteristics of dielectric constant.

With x smaller than 0.06 and y smaller than 0.03, the ceramic composition is poor in temperature characteristics of dielectric constant. With x greater than 0.30, the ceramic composition has an undesirably low dielectric constant. With y greater than 0.48 and z smaller than 0.20 and greater than 0.50, the ceramic composition has poor temperature characteristics of dielectric constant. If the total amount of the additive composed of PbWO$_4$ ($\leq$15 wt%) and/or Pb(Mg$_{\frac{1}{2}}$W$_{\frac{1}{2}}$)O$_3$ ($\leq$40 wt%) is less than 1 wt% based on the amount of the major constituents, the resulting ceramic composition has a high sintering temperature (above 1100° C.); and if the total amount of the additive is more than 40 wt% based on the amount of the major constituents and the amount of PbWO$_4$ is more than 15 wt%, the ceramic composition has a low dielectric constant.

The ceramic composition of high dielectric constant pertaining to the present invention should preferably have the major constituents specified by the following formula.

$$(1-x-y)\text{PbO}\cdot(x/2)\text{La}_2\text{O}_3\cdot y\text{MO}\cdot(1-z)\text{ZrO}_2\cdot z\text{TiO}_2$$

$0.09 \leq x \leq 0.30$
$0.04 \leq y \leq 0.38$
$0.25 \leq z \leq 0.46$

In addition, it should preferably contain 1.5–30 wt% (in total) of PbWO$_4$ and/or Pb(Mg$_{\frac{1}{2}}$W$_{\frac{1}{2}}$)O$_3$ based on the constituents (provided that the amount of PbWO$_4$ is less than 12 wt% and the amount of Pb(Mg$_{\frac{1}{2}}$W$_{\frac{1}{2}}$)O$_3$ is less than 30 wt%).

The ceramic composition of high dielectric constant pertaining to the present invention may be modified such that a certain amount of Pb in the composition is replaced by Ag and/or Bi. If the amount of Pb replaced by Ag is less than 5 mol%, the resulting ceramic composition is improved in temperature characteristics; but replacement by Ag in excess of 5 mol% undesirably lowers the dielectric constant. If the amount of Pb replaced by Bi is less than 6 mol%, the resulting ceramic composition is improved in sinterability; but replacement in excess of 6 mol% aggravates the temperature characteristics.

According to the present invention, the preferred ceramic composition is one in which Pb is replaced by 0–3.5 mol% of Ag and/or 0–4 mol% of Bi.

The ceramic composition of high dielectric constant pertaining to the present invention may be produced in the following manner. At first, raw material powders such as lead oxide, lanthanum oxide, barium oxide, strontium oxide, zirconium oxide, titanium oxide, magnesium oxide, tungsten oxide, bismuth oxide, silver oxide, barium titanate, and barium carbonate are weighed according to a prescribed ratio. They are thoroughly mixed using a wet ball mill. The resulting mixture is dried and, if necessary, calcined at 700°–850° C. for several hours. This calcination is not a must; but it makes the particles uniform and improves the dielectric properties. The calcined raw material powder is pulverized further with a wet ball mill, dried, and granulated with a binder such as polyvinyl alcohol. The granules are press-formed into a desired shape, followed by firing. The firing is performed at 900°–1100° C. for several hours.

The ceramic composition of high dielectric constant as defined above has a high dielectric constant and good temperature characteristics of dielectric constant. Therefore, it can be made into small-sized high-capacity capacitors having temperature-independent stability.

In addition, the ceramic composition of high dielectric constant pertaining to the present invention contributes to the reduction of production cost of multilayer ceramic capacitors because it can be fired at a low temperature. The firing at a low temperature permits the internal electrodes of multilayer ceramic capacitors to be made of a comparatively inexpensive silver-based material.

The invention is now described in more detail with reference to the following examples and comparative examples.

Dielectric ceramic compositions were prepared from PbO, La$_2$O$_3$, BaTiO$_3$, SrCO$_3$, Ag$_2$O, Bi$_2$O$_3$, TiO$_2$, ZrO$_2$, MgO, and WO$_3$ as the raw materials. (BaCO$_3$ may be used as a source of Ba.) Their mixing ratio is shown in Table 1. The weighed raw materials were mixed using a wet ball mill for 20 hours. The resulting mixture was dehydrated, dried, and calcined at 750° C. for 2 hours. The calcined mixture was pulverized again by using a wet ball mill for 20 hours, followed by dehydration and drying.

The resulting powder, after incorporation with an organic binder, was compression-molded into discs, 16 mm in diameter and 0.8 mm thick, under a pressure of 3 tons/cm$^2$. The greenware was fired in a magnesia ceramic vessel at 950°–1100° C. for 1 hour.

The resulting discoidal dielectric products were examined for electrical properties, with silver electrodes attached to both sides by firing at 700°–800° C. The results are shown in Table 2.

The dielectric constant and dielectric loss were measured with a YHP digital LCR meter, Model, 4274A, at a frequency of 1 kHz and a voltage of 1.0 V$_{rms}$. The specific resistance was measured with a YHP meter, Model 4329A, at an applied voltage of 100 V for 1 minute. The temperature characteristics are expressed by the change in percent that takes place in the temperature range of −25° to 85° C., with the dielectric constant at 25° C. being the reference.

It is noted from Table 2 that the ceramic compositions defined by the invention all have a high dielectric constant and yet change very little in dielectric constant with temperature. In addition, they have a low dielectric loss tangent and a high specific resistance. Their sintering temperature is low.

Sample No. 27 with x outside the specified range and Sample No. 28 with y outside the specified range are poor in the temperature characteristics of dielectric constant. Sample No. 29 with an excessive amount of Ag and Sample No. 30 with an excessive amount of PbWO$_4$ have a low dielectric constant.

TABLE 1

| Sample No. | Major constituents | | | Additives | | Ag amount replaced mol % | Bi amount replaced mol % | Ba:Sr ratio | Remarks |
|---|---|---|---|---|---|---|---|---|---|
| | x | y | z | PbWO$_4$ | Pb(Mg$_{\frac{1}{3}}$W$_{\frac{1}{3}}$)O$_3$ | | | | |
| 1 | 0.11 | 0.07 | 0.36 | 0 | 5.7 | 0 | 0 | 1:0 | Example of Invention |
| 2 | 0.10 | 0.25 | 0.30 | 5 | 25 | 0 | 0 | 1:0 | Example of Invention |
| 3 | 0.15 | 0.30 | 0.36 | 0 | 30 | 0 | 0 | 1:0 | Example of Invention |
| 4 | 0.10 | 0.25 | 0.30 | 0 | 20 | 0 | 0 | 0:1 | Example of Invention |
| 5 | 0.10 | 0.25 | 0.30 | 0 | 20 | 0 | 0 | 1:1 | Example of Invention |
| 6 | 0.11 | 0.13 | 0.36 | 0 | 5.7 | 1 | 1.3 | 1:0 | Example of Invention |
| 7 | 0.11 | 0.15 | 0.36 | 0 | 5.7 | 1 | 0 | 1:0 | Example of Invention |
| 8 | 0.11 | 0.13 | 0.27 | 0 | 5.7 | 2 | 0 | 1:0 | Example of Invention |
| 9 | 0.11 | 0.11 | 0.30 | 0 | 5.7 | 2 | 2.4 | 1:0 | Example of Invention |
| 10 | 0.11 | 0.07 | 0.36 | 0 | 5.7 | 2 | 1.2 | 1:0 | Example of Invention |
| 11 | 0.13 | 0.07 | 0.36 | 0 | 5.7 | 2 | 2.4 | 1:0 | Example of Invention |
| 12 | 0.11 | 0.13 | 0.36 | 0 | 5.7 | 2 | 2.4 | 1:0 | Example of Invention |
| 13 | 0.11 | 0.07 | 0.45 | 0 | 5.7 | 2 | 0 | 1:0 | Example of Invention |
| 14 | 0.08 | 0.18 | 0.36 | 0 | 5.7 | 2 | 4.0 | 1:0 | Example of Invention |
| 15 | 0.12 | 0.15 | 0.23 | 0 | 10.7 | 2 | 2.6 | 1:0 | Example of Invention |

TABLE 1-continued

| Sample No. | Major constituents | | | Additives | | Ag amount replaced mol % | Bi amount replaced mol % | Ba:Sr ratio | Remarks |
|---|---|---|---|---|---|---|---|---|---|
| | x | y | z | $PbWO_4$ | $Pb(Mg_{\frac{1}{2}}W_{\frac{1}{2}})O_3$ | | | | |
| 16 | 0.12 | 0.15 | 0.38 | 0 | 10.7 | 2 | 2.6 | 1:0 | Example of Invention |
| 17 | 0.12 | 0.10 | 0.38 | 0 | 10.7 | 2 | 2.6 | 1:0 | Example of Invention |
| 18 | 0.11 | 0.30 | 0.36 | 0 | 35 | 1 | 1.2 | 0:1 | Example of Invention |
| 19 | 0.11 | 0.07 | 0.36 | 0 | 5.4 | 2 | 0 | 0:1 | Example of Invention |
| 20 | 0.11 | 0.07 | 0.36 | 0 | 5.4 | 2 | 1.2 | 0:1 | Example of Invention |
| 21 | 0.11 | 0.09 | 0.36 | 3.4 | 0 | 2 | 0 | 1:0 | Example of Invention |
| 22 | 0.13 | 0.07 | 0.36 | 3.4 | 0 | 2 | 0 | 1:0 | Example of Invention |
| 23 | 0.11 | 0.07 | 0.28 | 3.4 | 5 | 2 | 1.2 | 1:0 | Example of Invention |
| 24 | 0.08 | 0.12 | 0.30 | 7.0 | 0 | 2 | 0 | 1:0 | Example of Invention |
| 25 | 0.11 | 0.07 | 0.36 | 3.4 | 0 | 1 | 0 | 0:1 | Example of Invention |
| 26 | 0.11 | 0.07 | 0.36 | 3.4 | 0 | 0 | 1 | 0:1 | Example of Invention |
| 27 | 0.05 | 0.07 | 0.36 | 0 | 5.7 | 2 | 0 | 1:0 | Comparative Example |
| 28 | 0.08 | 0.02 | 0.36 | 0 | 10.0 | 2 | 0 | 1:0 | Comparative Example |
| 29 | 0.18 | 0.07 | 0.36 | 0 | 15.0 | 5.5 | 0 | 0:1 | Comparative Example |
| 30 | 0.11 | 0.13 | 0.36 | 18 | 0 | 2 | 0 | 1:0 | Comparative Example |

TABLE 2

| Sample No. | Dielectric constant | Dielectric loss tangent (%) | Specific resistance ($\Omega \cdot cm$) | Temperature characteristics (−25 to 85° C.) | | Sintering temp. (°C.) |
|---|---|---|---|---|---|---|
| | | | | Minimum % | Maximum % | |
| 1 | 3400 | 1.36 | $3 \times 10^{13}$ | −18 | 10 | 1050 |
| 2 | 3600 | 0.75 | $7 \times 10^{13}$ | −18 | 8 | 980 |
| 3 | 3000 | 0.30 | $2 \times 10^{14}$ | −15 | 4 | 950 |
| 4 | 3500 | 0.75 | $4 \times 10^{13}$ | −18 | 3 | 980 |
| 5 | 3300 | 0.70 | $5 \times 10^{13}$ | −20 | 3 | 980 |
| 6 | 2890 | 0.32 | $8 \times 10^{13}$ | −7 | 3 | 1030 |
| 7 | 2440 | 0.27 | $1 \times 10^{14}$ | −10 | 5 | 1050 |
| 8 | 2790 | 0.17 | $6 \times 10^{13}$ | −2 | 5 | 1050 |
| 9 | 2360 | 0.64 | $1 \times 10^{14}$ | −10 | 5 | 1030 |
| 10 | 2010 | 0.76 | $9 \times 10^{13}$ | −9 | 10 | 1030 |
| 11 | 2980 | 0.52 | $9 \times 10^{13}$ | −12 | 8 | 1030 |
| 12 | 2430 | 0.18 | $6 \times 10^{13}$ | −4 | 3 | 1030 |
| 13 | 3350 | 0.69 | $2 \times 10^{14}$ | −22 | 12 | 1050 |
| 14 | 2350 | 0.26 | $8 \times 10^{13}$ | −15 | 11 | 1000 |
| 15 | 1540 | 0.23 | $1 \times 10^{14}$ | −8 | 1 | 980 |
| 16 | 1840 | 0.31 | $1 \times 10^{14}$ | −12 | 3 | 980 |
| 17 | 3020 | 1.30 | $1 \times 10^{14}$ | −12 | 14 | 980 |
| 18 | 2260 | 1.17 | $6 \times 10^{13}$ | −23 | 12 | 1020 |
| 19 | 1980 | 0.69 | $2 \times 10^{14}$ | −5 | 7 | 1050 |
| 20 | 2200 | 0.56 | $1 \times 10^{14}$ | −8 | 11 | 1030 |
| 21 | 3010 | 0.37 | $3 \times 10^{13}$ | −6 | 11 | 1050 |
| 22 | 2680 | 0.37 | $6 \times 10^{13}$ | −4 | 6 | 1050 |
| 23 | 2090 | 0.29 | $5 \times 10^{13}$ | −8 | 15 | 1030 |
| 24 | 1800 | 0.30 | $1 \times 10^{13}$ | −12 | 14 | 980 |
| 25 | 2420 | 0.30 | $5 \times 10^{13}$ | −13 | 12 | 1050 |
| 26 | 2420 | 0.30 | $5 \times 10^{13}$ | −13 | 12 | 1050 |
| 27 | 3600 | 2.10 | $1 \times 10^{13}$ | −35 | 16 | 1030 |
| 28 | 3800 | 3.10 | $2 \times 10^{13}$ | −32 | 16 | 1000 |
| 29 | 1300 | 0.21 | $1 \times 10^{14}$ | −8 | 2 | 1050 |
| 30 | 1400 | 3.82 | $2 \times 10^{14}$ | −30 | 25 | 950 |

What is claimed is:

1. A ceramic composition of high dielectric constant which comprises the major constituents of PbO, $La_2O_3$, MO, $ZrO_2$, and $TiO_2$ in the ratio defined by the formula below;

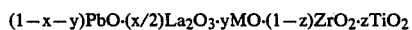

where,
M represents Ba and/or Sr;
$0.06 \leq x \leq 0.30$
$0.03 \leq y \leq 0.48$
$0.20 \leq z \leq 0.50$ and an additive represented by one of PbWO$_4$ and a combination of PbWO$_4$ and Pb(Mg$_\frac{1}{2}$W$_\frac{1}{2}$)O$_3$ in an amount of 1–40 wt%, in total based on the above-mentioned major constituents, provided that the amount of PbWO$_4$ is less than 15 wt% of the amount of the major constituents and the amount of Pb(Mg$_\frac{1}{2}$W$_\frac{1}{2}$)O$_3$ is less than 40 wt% of the amount of the major constituents.

2. A ceramic composition of high dielectric constant as claimed in claim 1, wherein x is defined by $0.09 \leq x \leq 0.30$.

3. A ceramic composition of high dielectric constant as claimed in claim 1, wherein y is defined by $0.04 \leq y \leq 0.38$.

4. A ceramic composition of high dielectric constant as claimed in claim 1, wherein z is defined by $0.25 \leq z \leq 0.46$.

5. A ceramic composition of high dielectric constant as claimed in claim 1, wherein the total amount of the additive represented by PbWO$_4$ or Ci combination of PbWO$_4$ Pb(Mg$_\frac{1}{2}$W$_\frac{1}{2}$)O$_3$ is 1.5 to 30 wt% based on the amount of the major constituents.

6. A ceramic composition of high dielectric constant as claimed in claim 1, wherein the amount of the additive represented by PbWO$_4$ is less than 12 wt% based on the amount of the major constituents and/or the amount of the additive represented by Pb(Mg$_\frac{1}{2}$W$_\frac{1}{2}$)O$_3$ is less than 30 wt% based on the amount of the major constituents.

7. A ceramic composition of high dielectric constant which comprises the major constituents of PbO, La$_2$O$_3$, MO, ZrO$_2$, and TiO$_2$ in the ratio defined by the formula below;

$$(1-x-y)PbO \cdot (x/2)La_2O_3 \cdot yMO \cdot (1-z)ZrO_2 \cdot zTiO_2$$

where,
M represents Ba and/or Sr;
$0.06 \leq x \leq 0.30$
$0.03 \leq y \leq 0.48$
$0.20 \leq z \leq 0.50$
and an additive represented by one of PbWO$_4$ and a combination of PbWO$_4$ and Pb(Mg$_\frac{1}{2}$W$_\frac{1}{2}$)O$_3$ in an amount of 1–40 wt%, in total, based on the above-mentioned major constituents, provided that the amount of PbWO$_4$ is less than 15 wt% of the amount of the major constituents and the amount of Pb(Mg$_\frac{1}{2}$W$_\frac{1}{2}$)O$_3$ is less than 40 wt% of the amount of the major constituents, with more than 0 and less than 5 mol% of all Pb in the composition replaced by Ag.

8. A ceramic composition of high dielectric constant as claimed in claim 7, wherein up to 3.5 mol% of all Pb in the composition is replaced by Ag.

9. A ceramic composition of high dielectric constant which comprises the major constituents of PbO, La$_2$O$_3$, MO, ZrO$_2$, and TiO$_2$ in the ratio defined by the formula below;

$$(1-x-y)PbO \cdot (x/2)La_2O_3 \cdot yMO \cdot (1-z)ZrO_2 \cdot zTiO_2$$

where,
M represents Ba and/or Sr;
$0.06 \leq x \leq 0.30$
$0.03 \leq y \leq 0.48$
$0.20 \leq z \leq 0.50$
and an additive represented by one of PbWO$_4$ and a combination of PbWO$_4$ and Pb(Mg$_\frac{1}{2}$W$_\frac{1}{2}$)O$_3$ in an amount of 1–40 wt%, in total based on the above-mentioned major constituents, provided that the amount of PbWO$_4$ is less than 15 wt% of the amount of the major constituents and the amount of Pb(Mg$_\frac{1}{2}$W$_\frac{1}{2}$)O$_3$ is less than 40 wt% of the amount of the major constituents, with more than 0 and less than 6 mol% of all Pb in the composition replaced by Bi.

10. A ceramic composition of high dielectric constant as claimed in claim 9, wherein up to 4 mol% of all Pb in the composition is replaced by Bi.

11. A ceramic composition of high dielectric constant which comprises the major constituents of PbO, La$_2$O$_3$, MO, ZrO$_2$, and TiO$_2$ in the ratio defined by the formula below;

$$(1-x-y)PbO \cdot (x/2)La_2O_3 \cdot yMO \cdot (1-z)ZrO_2 \cdot zTiO_2$$

where,
M represents Ba and/or Sr;
$0.06 \leq x \leq 0.30$
$0.03 \leq y \leq 0.48$
$0.20 \leq z \leq 0.50$
and an additive represented by one of PbWO$_4$ and a combination of PbWO$_4$ and Pb(Mg$_\frac{1}{2}$W$_\frac{1}{2}$)O$_3$ in an amount of 1–40 wt%, in total based on the above-mentioned major constituents, provided that the amount of PbWO$_4$ is less than 15 wt% of the amount of the major constituents and the amount of Pb(Mg$_\frac{1}{2}$W$_\frac{1}{2}$)O$_3$ is less than 40 wt% of the amount of the major constituents, with more than 0 and less than 5 mol% of all Pb in the composition replaced by Ag and with more than 0 and less than 6 mol% of all Pb in the composition replaced by Bi.

12. A ceramic composition of high dielectric constant as claimed in claim 11, wherein up to 3.5 mol% of all Pb in the composition is replaced by Ag and up to 4 mol% of all Pb in the composition is replaced by Bi.

* * * * *

UNITED STATES PATENT AND TRADEMARK OFFICE
CERTIFICATE OF CORRECTION

PATENT NO. : 4,843,046

DATED : June 27, 1989

INVENTOR(S) : Takashi Yamaguchi et al

It is certified that error appears in the above–identified patent and that said Letters Patent is hereby corrected as shown below:

In the title (cover page and column 1), change "$PBO_3$" to --PBO--.

In the abstract, line 11, change "$PbWo_4$" to --$PbWO_4$--.

Signed and Sealed this

Thirteenth Day of March, 1990

Attest:

JEFFREY M. SAMUELS

*Attesting Officer*    *Acting Commissioner of Patents and Trademarks*